Nov. 4, 1930.   W. E. SMITH   1,780,407
INSECT REPELLER
Filed Jan. 24, 1929
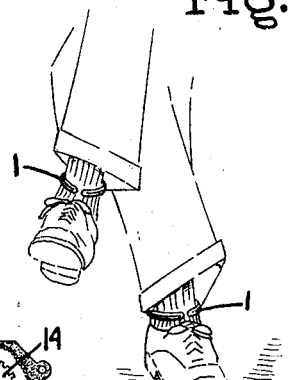
Fig. 1.
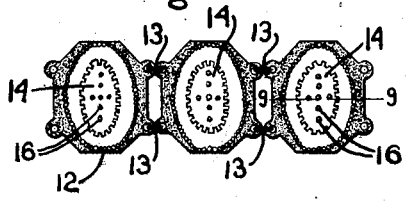
Fig. 8.
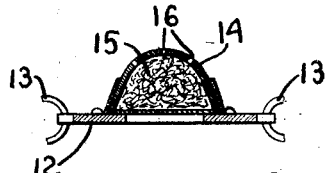
Fig. 9.
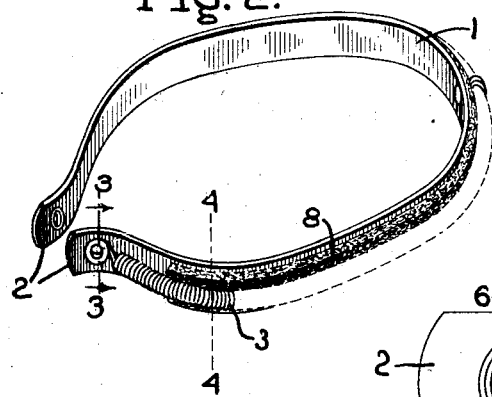
Fig. 2.  Fig. 3.
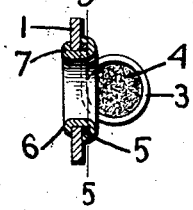
Fig. 5.  Fig. 4.
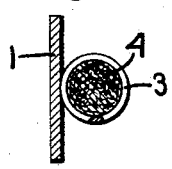
Fig. 6.
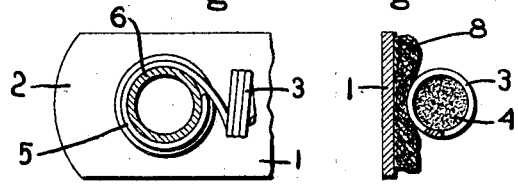
Fig. 7.
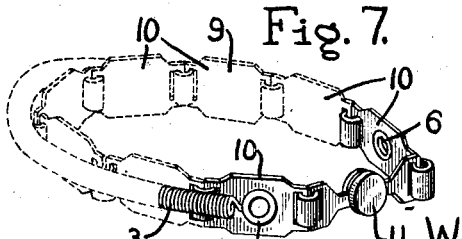
Inventor
Walter E. Smith
by Heard Smith & Tennant
Attys.

Patented Nov. 4, 1930

1,780,407

UNITED STATES PATENT OFFICE

WALTER E. SMITH, OF DAYTONA BEACH, FLORIDA

INSECT REPELLER

Application filed January 24, 1929. Serial No. 334,750.

This invention relates to an insect repeller and it has for its object to provide a device which can be readily worn by a person and which will be effective in repelling attacks by mosquitoes, flies and other insect pests.

A device embodying my invention is preferably in the form of a band adapted to be worn around one's ankle or arm or possibly around one's neck and it is provided with one or more containers to hold some insecticide or insect-repelling ingredient. This insecticide or insect-repelling ingredient may be either in solid or liquid form and if it is desired to use an insecticide in liquid form the containers will preferably be provided with absorbent pads which may be saturated with the liquid.

The device can be made so that it can be inconspicuous when it is worn or may be made so that it will have ornamental characteristics and may be thus worn as a bracelet or as a necklace.

In order to give an understanding of the invention I have illustrated in the drawings some selected embodiments thereof which will now be described after which the novel features will be pointed out in the appended claims.

Fig. 1 is a view illustrating one embodiment of my invention applied to a person's ankles;

Fig. 2 is a perspective view of a device embodying my invention;

Fig. 3 is an enlarged section on the line 3—3, Fig. 2.

Fig. 4 is a section on the line 4—4, Fig. 2;

Fig. 5 is a section on the line 5—5, Fig. 3;

Fig. 6 is a view similar to Fig. 4 but showing a modified form of the invention;

Fig. 7 is a perspective view of still a different embodiment of the invention;

Fig. 8 is a fragmentary view showing still a further embodiment of the invention;

Fig. 9 is an enlarged section on the line 9—9, Fig. 8.

My improved insect repeller comprises a band adapted to be worn around the ankles or around the wrist or arm or even around the neck, which band has associated therewith one or more containers adapted to hold some insecticide or insect-repelling material which may be in either solid form or liquid form. If in liquid form an absorbent pad will preferably be employed in each container which may be saturated with the liquid insecticide.

A simple form of the invention is shown in Fig. 2 wherein 1 indicates a resilient band which may be of metal or any other suitable material and which is shown as bent into nearly annular form with the ends 2 slightly separated from each other. Associated with this band 1 is a container 3 adapted to hold a pad 4 of absorbent material which is intended to be saturated with some insecticide or some insect-repelling ingredient. The container 3 is so formed as to allow ready escape of the odor of the insect-repelling material.

In the construction shown in Fig. 2 this container 3 extends throughout the length of the band 1, it being in the form of a coiled spring and the pad 4 is in the nature of felt or some other absorbent material which is inserted within the spring 3. The ends of the spring 3 are secured to the ends of the band 1 in any suitable way. As herein shown each end of the spring 3 is provided with a loop 5 which encircles a tubular rivet 6 that is set into the band 1 and is headed over on each side of the band as shown at 7. The heading over of the tubular rivet locks the loop 5 of the spring in place and this construction securely holds the spring 3 to the band 1 in a neat manner.

In placing the spring on the band 1 it will preferably be under slight tension so that the coils of the spring will be slightly opened and thus the odor of the insect-repelling material can readily escape. If desired, I may use an additional pad 8 between the spring and the band 1 as shown in Figs. 2 and 4 although this is not essential.

A device such as shown in Fig. 2 is adapted to be worn on the ankles as shown in Fig. 1. It is inconspicuous and can be worn without any discomfort.

When the pads 4 and 8, if both pads are used, are saturated with some insect-repelling material the presence of the device on the ankles of a person as shown in Fig. 1 will repel any mosquitoes or flies and thus save the wearer from the annoyance of having his or her ankles bitten by mosquitoes or flies.

In Fig. 7 I have shown a slightly different embodiment of the invention wherein the band is an articulated one. This band is indicated at 9 and is made up of a plurality of sections 10 jointed together. The container for the pad is illustrated in said Fig. 7 as a coil spring 3 such as above described, this spring 3 being secured at its ends to the two end sections 10 by the tubular rivet method illustrated in Figs. 3 and 5. In the device shown in Fig. 7, 11 indicates the detachable fastening by which the ends of the articulated band may be fastened about the wrist or ankle. The device shown in Fig. 7 is thus adaptable for being worn either on the ankles or on the arm or wrist.

In Figs. 8 and 9 I have illustrated still another embodiment of the invention wherein the band is of the articulated type but in which a plurality of pads are employed one for each section of the band. In said figures I have only shown a few sections of the articulated band, these being indicated at 12 and being pivotally connected together by the links 13.

Each section 12 is provided with a container 14 adapted to contain a pad 15 of absorbent material such as felt. This container may be made of sheet material and it is shown as provided with perforations 16 through which the odor of the insecticide with which the pad 15 is impregnated can escape. Each of the containers 14 are shown as secured to the section 12 in a manner similar to that in which stones are set in rings and other pieces of jewelry.

The device shown in Fig. 8 can be made quite ornamental as the sections 12 may be gold or silver plated and the containers 14 may be made to represent precious stones of some kind. A device such as shown in Figs. 8 and 9 can be worn as a bracelet or even as a necklace. There are many other ways in which the invention may be embodied in a band capable of being worn on the ankles or the arms and I do not wish the invention to be limited to the particular constructions herein illustrated.

Furthermore, it is possible to use my invention in connection with an insecticide either in liquid or in solid form. If the insecticide is in solid form then the absorbent pads would not be necessary as the solid insecticide or insect-repelling material could be placed directly in the container or containers. If this material is liquid form, however, the pads form a desirable vehicle for carrying the insecticide.

While any insecticide or insect-repelling material may be used it will preferably be one which gives off an odor that will repel the insects and the containers, of whatever form, are made so that the odor can readily escape.

I claim:

1. An insect repeller comprising a band adapted to be worn on the ankle, arm or other part of the body, a container secured to and carried by the band and encircling the latter, and a pad of absorbent material within the container, said absorbent material adapted to be saturated with an insect-repelling ingredient.

2. An insect repeller comprising a band adapted to be worn on the ankle, arm or other part of the body, a container carried by and encircling the band and a pad of absorbent material within the container, said absorbent material adapted to be saturated with an insect-repelling ingredient, and said container having an opening through which the odor of the insect-repelling material may percolate.

3. An insect repeller comprising a band adapted to be worn on the ankle, arm or other part of the body, a container secured to the band and extending longitudinally thereof and substantially encircling the band, and a pad of absorbent material within the container, which material is adapted to be saturated with an insect-repelling ingredient.

In testimony whereof, I have signed my name to this specification.

WALTER E. SMITH.